(12) United States Patent
Fürst et al.

(10) Patent No.: US 10,867,172 B2
(45) Date of Patent: Dec. 15, 2020

(54) METHOD FOR EVALUATING A DOCUMENT

(71) Applicant: WEBID SOLUTIONS GMBH, Berlin (DE)

(72) Inventors: Thomas Franz Fürst, Solingen (DE); Tim-Markus Kaiser, Berlin (DE); Frank Stefan Jorga, Hamburg (DE); Sven Oliver Jorga, Westerrönfeld (DE)

(73) Assignee: WEBID SOLUTIONS GMBH, Berlin (DE)

( * ) Notice: Subject to any disclaimer, the term of this patent is extended or adjusted under 35 U.S.C. 154(b) by 112 days.

(21) Appl. No.: 15/882,344

(22) Filed: Jan. 29, 2018

(65) Prior Publication Data
US 2018/0165516 A1   Jun. 14, 2018

Related U.S. Application Data

(63) Continuation-in-part of application No. 14/911,479, filed as application No. PCT/DE2014/100253 on Jul. 14, 2014, now Pat. No. 9,911,035.

(30) Foreign Application Priority Data

Aug. 12, 2013 (DE) .................. 10 2013 108 713

(51) Int. Cl.
G06K 9/00 (2006.01)
G06F 21/31 (2013.01)
(52) U.S. Cl.
CPC ......... *G06K 9/00483* (2013.01); *G06F 21/31* (2013.01); *G06K 9/00288* (2013.01); *G06K 9/00899* (2013.01)
(58) Field of Classification Search
CPC ........... G06K 9/00483; G06K 9/00899; G06K 9/00288; G06F 21/31
See application file for complete search history.

(56) References Cited

U.S. PATENT DOCUMENTS 5,119,375 A    6/1992 Paneth
5,239,654 A    8/1993 Ing-Simmons
(Continued)

FOREIGN PATENT DOCUMENTS

CN    101859451 A    10/2010
DE    102009022381 A1    11/2010
WO    WO2006076696 A2    7/2006

OTHER PUBLICATIONS

International Search Report for PCT/DE2014/100253; international filing date of Jul. 14, 2014; 6 pgs., dated Jan. 27, 2015.
(Continued)

*Primary Examiner* — Aaron W Carter
(74) *Attorney, Agent, or Firm* — Schmeiser, Olsen & Watts, LLP

(57) ABSTRACT

A method is provided for verifying a user's identity. The method has the following steps: connecting a first and a second data processing device for data communication; running a software application in the second data processing device; for user verification, receiving user identification data in the second data processing device, the user identification data comprising reference data; receiving one or more images of a document assigned to the user in the second data processing device; determining measurement data from image data providing a digital representation of the one or more images; comparing the reference data to the measurement data determined from the digital representation of the one or more images; and providing verification data in the second data processing device, the verification data indicative of the user's identity being verified in the step of comparing the reference data to the measurement data.

7 Claims, 5 Drawing Sheets

(56) References Cited

U.S. PATENT DOCUMENTS

Figure 1:
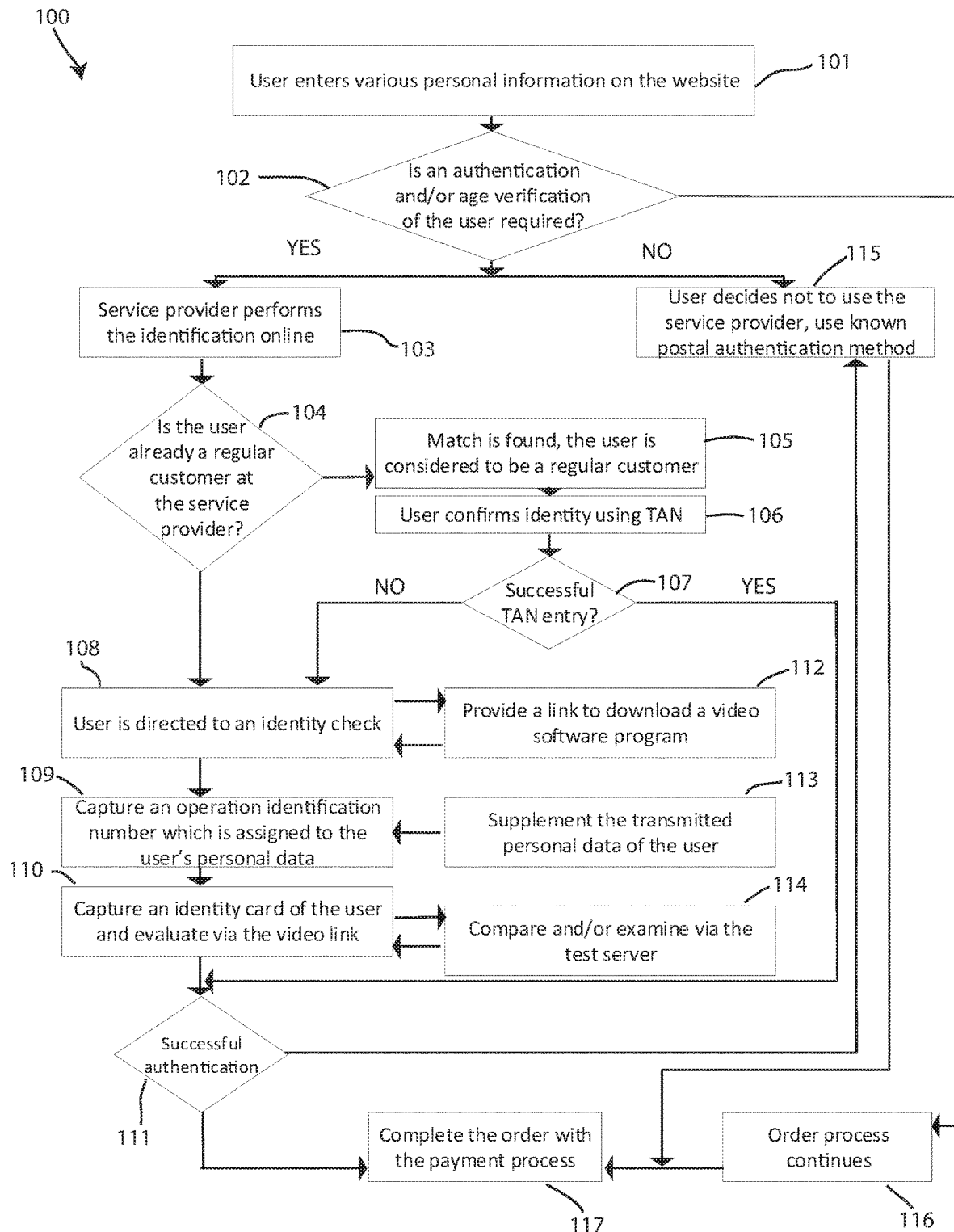

| | | | | |
|---|---|---|---|---|
| 6,178,507 | B1* | 1/2001 | Vanstone | G06Q 20/341 |
| | | | | 713/169 |
| 6,249,867 | B1* | 6/2001 | Patel | H04L 9/0841 |
| | | | | 380/255 |
| 6,424,712 | B2* | 7/2002 | Vanstone | G06F 7/725 |
| | | | | 380/28 |
| 6,782,100 | B1* | 8/2004 | Vanstone | G06F 7/725 |
| | | | | 380/259 |
| 7,392,388 | B2* | 6/2008 | Keech | G06Q 20/02 |
| | | | | 713/170 |
| 7,581,257 | B1* | 8/2009 | O'Hara | G06Q 20/40 |
| | | | | 705/75 |
| 7,734,779 | B1* | 6/2010 | Piccionelli | H04L 63/083 |
| | | | | 709/225 |
| 8,549,298 | B2* | 10/2013 | Rouskov | H04L 9/3213 |
| | | | | 380/283 |
| 8,935,265 | B2 | 1/2015 | Tang | |
| 9,207,069 | B2* | 12/2015 | Kitamura | G01S 17/89 |
| 9,544,137 | B1* | 1/2017 | Brandwine | G06F 9/4401 |
| 9,911,035 | B2* | 3/2018 | Furst | G06F 21/31 |
| 2002/0057796 | A1* | 5/2002 | Lambert | G06F 7/725 |
| | | | | 380/28 |
| 2003/0139994 | A1 | 7/2003 | Jones | |
| 2004/0049401 | A1 | 3/2004 | Carr | |
| 2004/0158724 | A1 | 8/2004 | Carr | |
| 2004/0247131 | A1* | 12/2004 | Buer | G06Q 20/3674 |
| | | | | 380/278 |
| 2005/0080693 | A1 | 4/2005 | Foss | |
| 2005/0160049 | A1* | 7/2005 | Lundholm | G06F 21/10 |
| | | | | 705/59 |
| 2005/0246293 | A1* | 11/2005 | Ong | G06Q 30/06 |
| | | | | 705/70 |
| 2006/0157559 | A1 | 7/2006 | Levy | |
| 2008/0162938 | A1* | 7/2008 | Struik | H04L 9/0844 |
| | | | | 713/171 |
| 2009/0150670 | A1* | 6/2009 | Taguchi | H04L 63/08 |
| | | | | 713/169 |
| 2010/0131414 | A1 | 5/2010 | Tame | |
| 2012/0030108 | A1 | 2/2012 | Katina | |
| 2012/0079577 | A1 | 3/2012 | Hao | |
| 2012/0096277 | A1* | 4/2012 | Perez Soria | G06Q 20/3274 |
| | | | | 713/179 |
| 2012/0173431 | A1* | 7/2012 | Ritchie | G06Q 20/385 |
| | | | | 705/65 |
| 2012/0191978 | A1* | 7/2012 | Little | H04L 51/066 |
| | | | | 713/176 |
| 2013/0016832 | A1* | 1/2013 | Yamashita | G06F 21/606 |
| | | | | 380/44 |
| 2013/0067016 | A1* | 3/2013 | Adkins | H04L 9/0866 |
| | | | | 709/208 |
| 2014/0279516 | A1* | 9/2014 | Rellas | G06Q 30/0185 |
| | | | | 705/44 |
| 2015/0003615 | A1* | 1/2015 | Vanstone | H04L 9/0847 |
| | | | | 380/282 |
| 2016/0196470 | A1* | 7/2016 | Furst | G06F 21/31 |
| | | | | 382/112 |
| 2016/0275300 | A1* | 9/2016 | Ko | H04L 9/0822 |
| 2018/0165516 | A1* | 6/2018 | Furst | G06K 9/00899 |
| 2018/0197003 | A1* | 7/2018 | Furst | G06F 21/31 |
| 2018/0204206 | A1* | 7/2018 | Flurscheim | G06Q 20/3276 |

OTHER PUBLICATIONS

International Preliminary Report on Patentability for PCT/DE2014/100253; international filing date of Jul. 14, 2014; 8 pgs., dated Feb. 25, 2016.

Weiterentwicklung Der Falschungssicherheit Von Passen Und Personalausweisen; Bundesministerium des Innern; 2 pgs., 2005.

Frontex—Best Practice Technical Guidelines for Automated Border Control (ABC) Systems; Research and Development Unit; 62 pgs., 2012.

* cited by examiner

METHOD FOR EVALUATING A DOCUMENT

CROSS-REFERENCE TO RELATED APPLICATIONS

This application is a continuation-in-part to U.S. application Ser. No. 14/911,479, filed on Feb. 11, 2016, entitled, "METHOD FOR EVALUATING A DOCUMENT", which claims priority to PCT Application No. PCT/DE2014/100253, having a filing date of Jul. 14, 2014, which claims priority to German Application No. 10 2013 108 713.2, having a filing date of Aug. 12, 2013, the entire contents all of which are hereby incorporated by reference.

FIELD OF TECHNOLOGY

The following relates to a method for evaluating a document. Further, a method for verifying a user's identity is provided.

BACKGROUND

In some business processes, it may be necessary to verify the identity and/or the age of a user, to satisfy legal requirements, for example. In the past, for example, it was usual for the user to prove his identity to a postal employee by presenting his personal ID card to the employee for visual inspection and examination. Then, a document confirming the identity of the user was sent by post. This method is extremely slow for the user, because it is always associated with a visit to a post office. For this reason, this method is also associated with a high rate of early termination.

A method for web-based identification of individuals is known from document DE 10 2009 022 381 A1. In this method, recorded personal data of a user is collected via the web (internet). This data is compared with data from a reference data to identify the user. Then, an authorisation code is sent to the user, who is now able to use the code for authentication purposes. The disadvantage of this is that the user must undergo at least one personal identification before the reference data can be captured. The postal method described in the foregoing may be used to enable personal identification of the user. Accordingly, the user is again obliged to visit a post office at least once.

A method and a system for evaluating documents are disclosed in document US 2003/0139994 A1. A user may insert an ID card or a drivers license in the device. Personal data of the user may e captured from the document inserted by text recognition. In this procedure, a signature by the user may be collected from the document compared with another signature to determine whether they match. In this case, the user must use the device, which is installed in a bank, for example.

SUMMARY

An aspect relates to a method for evaluating documents that can be used quickly, easily and securely. In particular, the user should not have to make physical journeys to visit facilities. The identity of a user shall be verified efficiently and securely.

According to an aspect, a method for verifying a user's identity is provided, the method comprising: connecting a first and a second data processing device for data communication; running a software application in the second data processing device; for user verification, receiving user identification data in the second data processing device, the user identification data comprising reference data; receiving one or more images of a document assigned to the user in the second data processing device; determining measurement data from image data providing a digital representation of the one or more images; comparing the reference data to the measurement data determined from a digital representation of the images; and providing verification data in the second data processing device, the verification data indicative of the user's identity being verified in the step of comparing the reference data to the measurement data determined from a digital representation of the images.

According to another aspect, a method for evaluating a document is provided. The method comprises the following steps. A video data link for transferring a video signal between a second data processing device having a video recording device, and a first data processing device is provided. An operation identification number assigned to user data is captured in the first data processing device. User data is transmitted to the first data processing device. A document is captured by the video recording device and an image of the document is transmitted to the first data processing device via the video data link. The document is evaluated. The result of the evaluation is stored in a database together with the operation identification number and the user data.

In one embodiment, the method may further comprise the following steps, which are carried out optionally before the video data link is established and/or before the operation identification number is captured: generating the operation identification number in a fourth data processing device and transmitting the operation identification number from the fourth data processing device to the second data processing device.

In a further embodiment, the method may further comprise the following steps, which are carried out optionally after the operation identification number is detected: transmitting the operation identification number from the first data processing device to the fourth data processing device, and transmitting the user data from the fourth data processing device to the first data processing device in response to receiving the operation identification number.

The method may be integrated in a method that a requests an identification or verification of a user, for example. It may be provided that a user on the website of a vendor wishes to enter into a contract. In order to complete the agreement, it may be necessary to check the user, for example, to satisfy legal regulations. Such a check may include the user's identity and/or age, for example. The vendor may be for example a bank with which an account is to be opened, a retailer selling goods that fall under the Youth Protection Act, or another service provider (e.g., online gaming, betting shop), which requires proof that the user has reached the age of majority before the contract can be concluded, for example. The provider of the website can be made available by a third data processing device.

The vendor's website may be made available by a third data processing device. The user can access the website and interact with it via the second data processing device, for example. For this, the user can use a web browser (called a browser for short), for example, which is installed on the second data processing device. For example, the user can enter user data in a form on the vendor's website. Alternatively, user data may already be stored with the vendor. In this case, the user can log onto the third data processing device using a user identification (e.g., username and password) so that the existing user data is used. If the user's identity and/or age has to be checked before the contract can be concluded signing the contract, this check may be made available by a service provider. For example, a button that initiates the check may be displayed on the vendor's website.

After the button is activated, the user data may be transmitted from the third data processing device to a fourth data processing device, which is operated by the service provider. The fourth data processing device may be coupled to a database, for example in the manner of a customer relationship management (CRM) system. The user data may be transmitted in encrypted form. The user data is then compared with data stored in the database records.

The user data may for example include the following information about the user either individually or in any combination thereof: name (first name and/or last name), academic degree, address (street, house number, postal code and city), a telephone number (landline and/or mobile number), place of birth, country and an email address. When the user data is entered, it may be provided that it is compulsory to supply certain data, for example first name, last name, mobile number and/or email address. The comparison of the transmitted user data with the data records may be based on all the data or on selected data. For example, a check may be carried out to determine whether the email address exists in the database. If so, this may be used to identify the user in the database. It may be provided that when the transmitted user data is compared with the data records from the database, a similarity relation is considered. For example, the user may be identified if the transmitted address differs from the stored address (e.g., due to a move), but the other data matches. A threshold value for the similarity of the data records may be adjustable.

If the user is identified as having been captured in the database already on the basis of the transmitted data, the customer is regarded as a regular customer. The further process for a regular customer is described below.

If the user data does not match data in the service provider's database, the user is considered to be a new customer. In this case, use the following sequence may be initiated.

A video data link is provided for transmitting a video signal between the second data processing device and the first data processing device. For this purpose, the second data processing device must comprise a video recording device. The video recording device may be integrated in the second data processing device or it may be coupled therewith. The video recording device may be a webcam, a (digital) video camera or a (digital) camera for example. It may further by provided that an audio signal is transmitted together with the video signal. For this purpose, the second data processing device may have an audio recording device, for example a microphone, which may be integrated in or connected to the second data processing device. The video data link, with which the video signal and optionally also the audio signal is transmitted, may be provided in encrypted form. The first data processing device may comprise a display device, such as a screen, and/or a sound reproduction device, such as a loudspeaker.

It may be provided that a check is carried out to determine whether the second data processing device comprises a video recording device before the video data link is provided, by the first, third or fourth data processing device for example. The check may be carried out for example by reading a browser configuration of the browser.

It may further be provided that a check is carried out to determine whether the second data processing device comprises video software or browser-based video telephony for providing the video data link before the video data link is provided. If the result of the check is negative, a hyperlink may be provided, by which the video software can be downloaded. The check may be carried out by the first or third data processing device. The hyperlink may be provided by the first or third data processing device, on the vendor's website for example. Examples of video software are Skype or FaceTime. Alternatively or additionally, video software may be provided by the vendor to download.

In the first data processing device, an operation identification number assigned to the user data is captured. It may be provided that the operation identification number is generated before-hand by the fourth data processing device, after the customer data is received from the third data processing device, for example. The operation identification number serves as the unique identifier of the identification operation for the user. A specific, unique operation identification number can be created for each identification operation for the user. For example, if a user wishes to open an account at two banks, he must undergo identification by both banks. A unique operation identification number is created for each identification and assigned to the user data.

The operation identification number may be transmitted from the fourth data processing device to the second data processing device, for example via e-mail or short message service (SMS). It may also be provided that the operation identification number is displayed in the browser of the second data processing device. The user can transmit the operation identification number to an agent that service the first data processing device, via the video data link, for example. Alternatively it may be provided that the user tells the agent the operation identification number verbally, in other words the transmission is made acoustically. The agent then enters the operation identification number in the first data processing device via an input device. Alternatively, the operation identification number may be transmitted from the second data processing device to the first data processing device, e.g., by e-mail, SMS or an electronic form in which the user enters the operation identification number that is to be transmitted. As another alternative, the operation identification number may be transmitted directly from the fourth data processing device to the first data processing device.

The operation identification number may be a 9-digit number, for example. Alternatively a mix of alphanumeric characters may be provided. The operation identification number may include a randomly generated number, characters, sequence of numbers and/or characters. It may be provided that the operation identification number is formed from an earlier operation identification number. For this purpose, the operation identification number may incorporate a random number as well as the previous operation identification number. Positions between the previous operation identification number and the random number are padded with zeros. Finally, the last digit can be swapped with any other digit. It may be provided that the operation identification number is tamperproof. It should be ensured for control purposes that the operation identification number is assigned uniquely to an identification, so that it can be tracked at a later time. It may also be provided that the operation identification number is only valid for a limited time, such as an hour. After this time has elapsed, the operation identification number is invalid and can no longer be used.

After the operation identification number is captured (by typing in, for example), it can be transmitted to the fourth data processing device from the first data processing device. In response to this, the fourth data processing device may transmit the user data assigned to the operation identification number to the first data processing device. The transmission may be encrypted. It may be provided that the user data transmitted by the first data processing device cannot be changed. In this way, manipulation of user data is reliably prevented by the agent. In another embodiment, the user data may be changeable by the first data processing device. This enables the existing user data to be corrected or supplemented.

A document is captured by the video recording device in the second data processing device. An image of the document is transmitted to the first data processing device. Here, the image of the document can be displayed by a display device. It may be provided that the agent gives the user instructions regarding a certain positioning of the document, so that it is captured with sufficient accuracy by the video recording device. Alternatively or additionally, it may be provided that auxiliary lines are shown on a display device coupled to the second data processing device to indicate the correct position of the document. The auxiliary lines may be generated by the first data processing device and transmitted from the first data processing device to the second data processing device.

The document is evaluated. The evaluation may include, for example, a check of the document's authenticity and/or a check of the authenticity of a signature on the document. It may be provided that the document is evaluated automatically by the first data processing device.

In the context of the user classified as a new customer, the document may be evaluated to create a user profile for the user, so that the user is recognized as a regular customer in subsequent interactions. In order to capture the user as a regular customer, it may be necessary to verify his identity, to satisfy legal requirements, for example. It may be provided that a personal identification document, for example an identity card, a passport or a driving license is evaluated as the document.

Finally, the result of the evaluation is stored together with the operation identification number and the user data in a database. For this purpose, the data may be transmitted from the first data processing device to the fourth data processing device and stored in the database coupled therewith. It may be provided that at least part, if not all of the video signal and/or the audio signal is/are stored in the database.

A check of the user's identity may be carried out on the basis of the personal identification document. For example, the agent can compare the transmitted user data with the information on the personal identification document. For this, the user data may be displayed on a screen mask, in a two-column form for example. One column contains the transmitted user data, another column is initially empty. During the check of the personal identification document, the reviewed and confirmed user data may be inserted in the other column to show that the check was successful. A button may be provided to transfer each data item. Empty fields in the screen may be highlighted, by a coloured marking, for example. Missing data may be added as necessary by the agent. Additionally, the view of the user may be compared with a photo on the personal identification document. A checklist listing the points to be checked may be made available. It may also be provided that security features of the personal identification document are evaluated in order to check the authenticity of the personal identification document. For example, security features in the form of watermarks and/or structural patterns may be evaluated.

It may be provided that the following information about the agent is stored in the database: name of a call centre, in which the agent operates, location, telephone number, name of the agent (first name, surname), an agent identification number, a call centre identification number and any combination thereof.

Alternatively, the identity check may be carried out automatically by the first data processing device. The first data processing device may further be configured to check security features of the personal identification document. It may be provided that an image of the personal identification document is captured and stored. Storage may be provided in the first data processing device, for example as intermediate storage, or in the database that is coupled to the fourth data processing device. The image may include a front and/or back of the personal identification document. An image of the user may also be captured and stored if necessary by the video recording device. It may be provided that a photo is read out from the image of the personal identification document and stored in a separate photo image.

The image of the user and the photo image may be normalized, for example according to size, colour intensity and/or orientation. It may be provided that the number of normalization steps required for each image is stored. The normalized image of the user and/or the normalized photo image may also be stored.

It may further be provided that the two images are each converted into an image with reduced colour, for example, a grey shaded or black-and-white image. The background in the area around the head may be coloured white. The number of adjustment steps for the two images may be stored. Similarly, the converted image of the user and/or the converted photo image may also be stored.

The following parameters may be determined either individually or in any combination from the two images (each in original, normalized, or converted form): horizontal distance between tips of the ears, horizontal distance between outer corners of the of eyes, horizontal distance across the nostrils (width of the nose), horizontal outer distance of the neck (width of the neck), horizontal outer width of the face below the ears and horizontal distance between the extremities of the eyebrows. Provision may be made to compare the calculated distances with each other to check if they match. The images may be considered identical if not more than one element could not be determined (for example, because hair is covering the ears) and no element manifests a deviation greater than 5%. It may additionally be provided to adjust an acceptable deviation level dynamically, in a range from 1% to 20%, for example. This enables different security requirements to be addressed. Provision may also be made for a similarity evaluation of the face shape and possibly other details.

It may further be provided that data fields from the image of the personal identification document are read out by the first data processing device. The data read out may be, for example, a name (first name (s) and/or last name), an academic degree, a date of birth, a place of birth, a citizenship, an expiration date of the personal identification document, an identification number of the personal identification document, an access number, a signature and any combination thereof. The above data may be provided on the front of the personal identification document, for example. Alternatively or additionally, the following information may be collected by the first data processing device: an address (street, house number, city and/or postal code), an eye colour, height, a date of issue of the personal identification document, an issuing authority, a professional name, and any combination thereof. This information may be supplied for example on the back of personal identification document.

It may further be provided that at least part of a two-line machine-readable area on the front of an old German identity card (issued before 30 Oct. 2010) or of a three-line machine-readable area on the back of a new German identity card (issued from 1 Nov. 2010) is read out. The machine-readable areas can also be captured in full. For the machine-readable areas a non-proportional font is usually used. Each character has the same tracking. The symbol "<" is used instead of spaces. Each position in the machine readable zone is thus occupied by a character. The first data processing device may be configured to recognize an old or new German identity card.

It may be provided that a check of the captured data is carried out, a format and/or a logic check, for example. It may be checked for example that the date of birth appears in the format DD.MM.YY (D—day, M—month, Y—year). In a German identity card is checked, the only nationality possible is "German". In addition, provision may be made for a check of foreign identity documents. In this case, only the nationality of the respective issuing country is possible as a nationality. A check number on the personal identification document may also be checked. An algorithm to form a checksum is known for German identity cards, for example. On the basis of the captured (possibly machine-readable) data, a check may be carried out by the first data processing device as to whether the checksum is correct. Another check may include a comparison of the validity date with a current date. The check may be considered failed in the following cases: the personal identification document has expired, the format and/or logic control lead to a negative result, the checksum is incorrect, more than three data fields cannot be read out. It may be provided that the check is considered failed when even one of the aforementioned cases occurs. It may be provided that the procedure for evaluating the personal identification document (identity verification) is restarted, if a previous run was unsuccessful. The restart may be initiated by the agent or automatically by the first data processing device.

It may further be provided that security features of a German identity card are captured and evaluated by the first data processing device. To this end, an evaluation of the following security features may be provided: a structure in the background of a photo, a horizontal structure below the photo, a structure in the central region in the right edge, a structure in the top border (from the top edge to about 1.5 cm below) and any combination thereof. The abovementioned security features may also be referred to as official security features. The security features may be evaluated for example by comparing them with stored, standard templates of the security features. A similarity evaluation of the captured security features with the stored standard templates may be performed. It may be provided that the examination of the security features is only classified as positive if all captured, preferably all of the above, security features pass the comparison with the respective standard templates.

Alternatively or additionally, the capture and evaluation of additional security features of a German identity card may be provided by the first data processing device. The captured additional security features may be compared with stored reference values. The reference values may be stored in the database that is coupled with the fourth data processing device, for example. The additional security features may comprise the following features for an old German identity card: distance from the bottom edge to a lower black line on the front, distance between two black lines on the front, distance from the top edge of the machine-readable zone to the bottom edge of the photo on the front, total height and/or total width of the printed area on the front, distance from the right edge to the beginning of the printed area on the back, distance from the bottom edge to the beginning of the text of the surname, distance between the surname and the date of issue on the rear, and any combination thereof. The automatic comparison may be considered successful if, for example, at least 6 of the aforementioned additional security features could be determined, and the deviation when compared with the respective reference values is less than 5% in each case. Provision may also be made for dynamic adjustment of the deviation.

The additional security features for a new German ID card (issued since 1 Nov. 2010) may include the following: distance from the bottom edge to the beginning of the bottom edge of the printed photo on the front, distance from the top edge to the beginning of the ID number on the front, distance from the top edge to the top edge of the photo on the front, the total height and/or total width of the printed area on the front, distance between the left edge and the beginning of the printed area on the back, distance between the bottom edge and the beginning of the machine-readable zone, height of the machine-readable zone on the back, total width of the machine-readable zone on the back, and any combination thereof. The automatic comparison may be considered successful for example if at least 6 of the aforementioned further security features could be determined, and the deviation when compared with the respective reference values is less than 5% in each case. Provision may also be made for dynamic adjustment of the deviation.

The security features and/or additional security features may be checked alternatively or additionally by the agent. The agent may then instruct the user in how to hold the personal identification document (for example, the identity card) in front of the video recording device so that a check of the security features and/or additional security features by the first data processing device is made possible, and/or the agent can verify the security features and/or additional security features.

It may further be provided that the user data is sent to a fifth data processing device. The fifth data processing device then checks whether as least some of the user data is contained in a further database coupled to the fifth data processing device. The fifth data processing device may transmit the information regarding whether or not the user data is contained in the further database to the first data processing device as the result.

If the evaluation of the personal identification document has been completed successfully, that is to say the user's identity has been confirmed, the user may be included as a regular customer. The user's data can be stored in the database, optionally together with a user identification number assigned to the user. For this purpose, it may be provided that the user data and/or data from the evaluation of the personal identification document be transmitted from the first data processing device to the fourth data processing device in encrypted and/or compressed form. It may be provided that the transmitted data is converted by the fourth data processing device into a format that is not readable in plain text. The user data and/or data from the evaluation of the personal identification document may also be transmitted from the first data processing device to the third transmitted processing device in encrypted and/or compressed form. The data may be transmitted in each case by POST BASE64 string, for example.

An electronic message may be sent to the user via e-mail and/or SMS, for example, informing him that the identification has been successful.

After the user has been successfully checked and/or identified by the service provider, a corresponding message may be transmitted to the third data processing device (to the vendor's web-site, for example), optionally together with the operation identification number. The user can then perform the further actions, such as concluding the contract. It may be provided that a transaction number (TAN) is transmitted to the successfully checked new customer. After entering and examining the TAN, the user can perform other actions. Further details on the TAN are listed in the following.

For regular customers and/or successfully checked new customers (who have subsequently been included as regular customers), it may be provided that the user data is matched with the database. Additionally or alternatively, it may be provided that a customer identification number is assigned to each regular customer. When the user enters his customer identification number, a check may be run to determine whether is already stored in the database. After the user data and/or customer identification number has been matched successfully, a transaction number (TAN) is transmitted to the user, for example via e-mail, SMS and/or voice announcement over telephone. The TAN is stored in the database, optionally together with the assigned operation identification number. After the TAN is entered on the vendor's website, a check as to whether the TAN entered matches the stored TAN is carried out. If the result of this check is positive, the user is recognized as a regular customer and can immediately undertake further actions on the website. It may be provided that a button is displayed on the vendor's web site, which the user can click to indicate that he is a regular customer. This then leads directly to the check of user data. Provisions may further be may so that it is automatically determined whether the user is a regular customer, for example on the basis of the entered user data, particularly with reference to the e-mail address.

The TAN may be generated by the fourth data processing device, as a 6-digit number, for example. It may be provided that the TAN is only valid for a limited time, for example up to one hour after its generation. This may be checked as necessary when the TAN is entered. It may further be provided that the user has only a limited number of attempts to enter the TAN. The entry of a non-matching TAN (for example because of typing errors) may be limited to three attempts. For this, the fourth data processing device may be configured to count and check the number of times the TAN has been input. The fourth data processing device may also perform a logic test of the TAN, to determine whether it has a specific format, for example. It may also be checked as to whether there is an operation identification number for the TAN. It may, be provided that the TAN is deleted in the database after successful input.

The vendor's data may also be stored in the database. The vendor data may include the following information: first name, last name, company name, address (street, house number, postal code, city), country, a vendor identification number, a date of application and any combination thereof. A comment indicating whether a contractual relationship exists between the vendor and the service provider may also be stored. For example, the vendor identification number may be assigned to user data that is transmitted to the third data processing device.

It may further be provided that a signature on the document is evaluated. For this purpose, the signature may be captured by the video recording device. The first data processing device may be configured to compare the captured signature with signatures stored in the database to determine a match. For the match, a similarity relation may be used, which indicates how large the deviation between the captured and the stored signature may be, and still allow that the signatures are the same. The signature on a personal identification document of which an image is stored in the database, may be used as a stored signature, for example.

The method is carried out by a plurality of data processing devices. Each data processing device may have for example one or more processors and storage capacity with one volatile (e.g. RAM) and/or one non-volatile (e.g. hard disk) memory. The data processing devices may also each comprise communication means for receiving and/or transmitting data and/or data streams, such as a Local Area Network (LAN) connection, a Wireless Local Area Network (WLAN) connection, a Universal Serial Bus (USB) port, a Bluetooth adapter and/or a Firewire port (IEEE 1394). The data processing devices may each comprise a device for capturing a user input, such as a keyboard, a mouse and/or a touchpad. The data processing devices may each be connected to a display device. Alternatively, a display device may be integrated in each of the data processing devices. The display device may include a touch-sensitive screen for capturing a user input. The data processing devices may each be configured as a server, web server, personal computer, laptop, tablet PC or smartphone, for example.

A device or system comprising a first data processing device, a second data processing device having a video recording device and a database may be provided, wherein the device is configured or designed to carry out the following method; providing a video data link for transmitting a video signal between the second video data processing device comprising the video recording device, and the first data processing device; capturing an operation identification number associated with the user data in the first data processing device; transmitting user data to the first data processing device; capturing a document by the video recording device and transmitting an image of the document to the first data processing device via the video data link; evaluating the document; and storing the result of the evaluation with the operation identification number and the user data in a database.

With regard to the device, the embodiments disclosed for the method for evaluating documents also apply mutatis mutandis.

BRIEF DESCRIPTION

Figure 2:
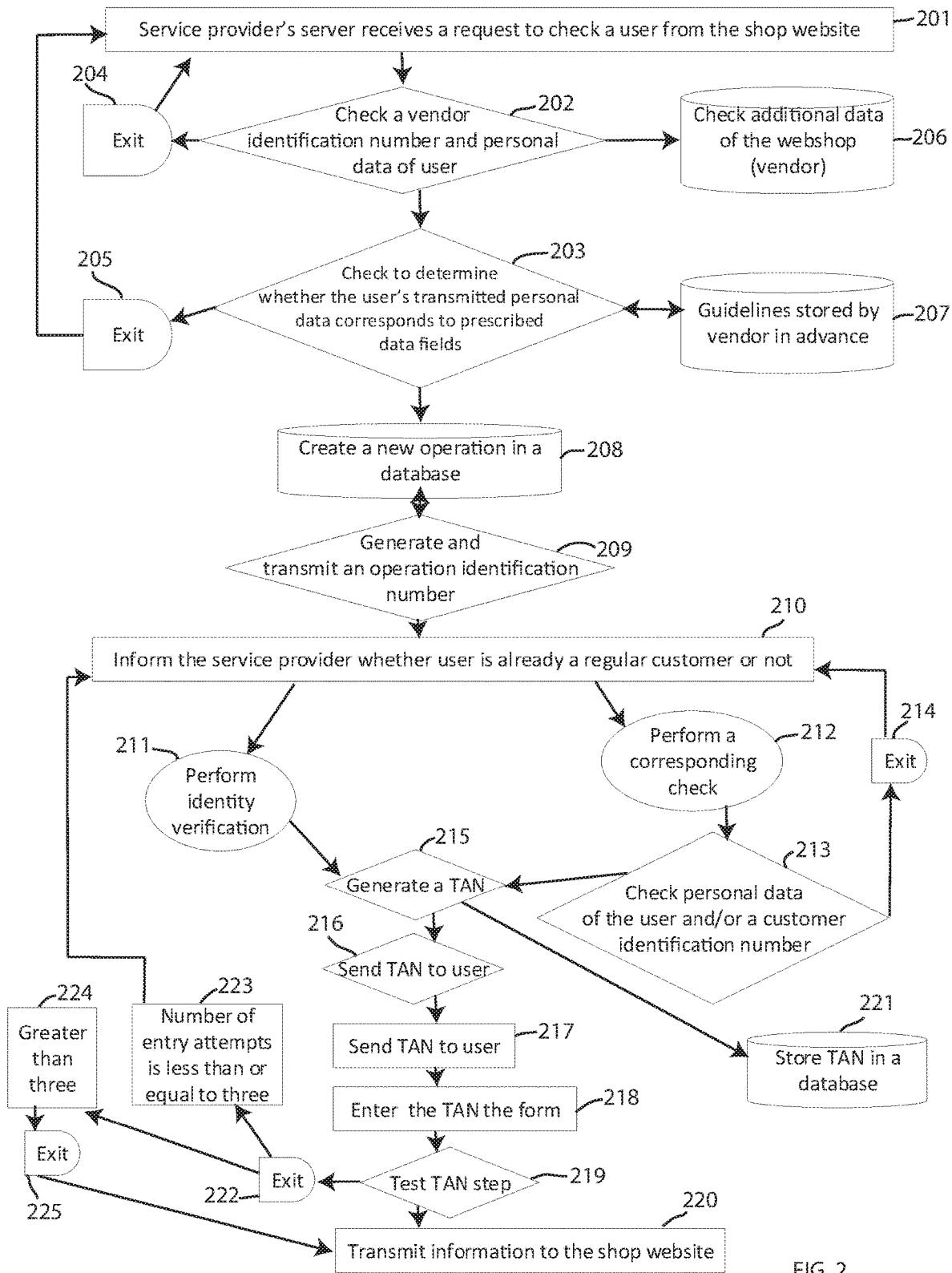
Figure 3:
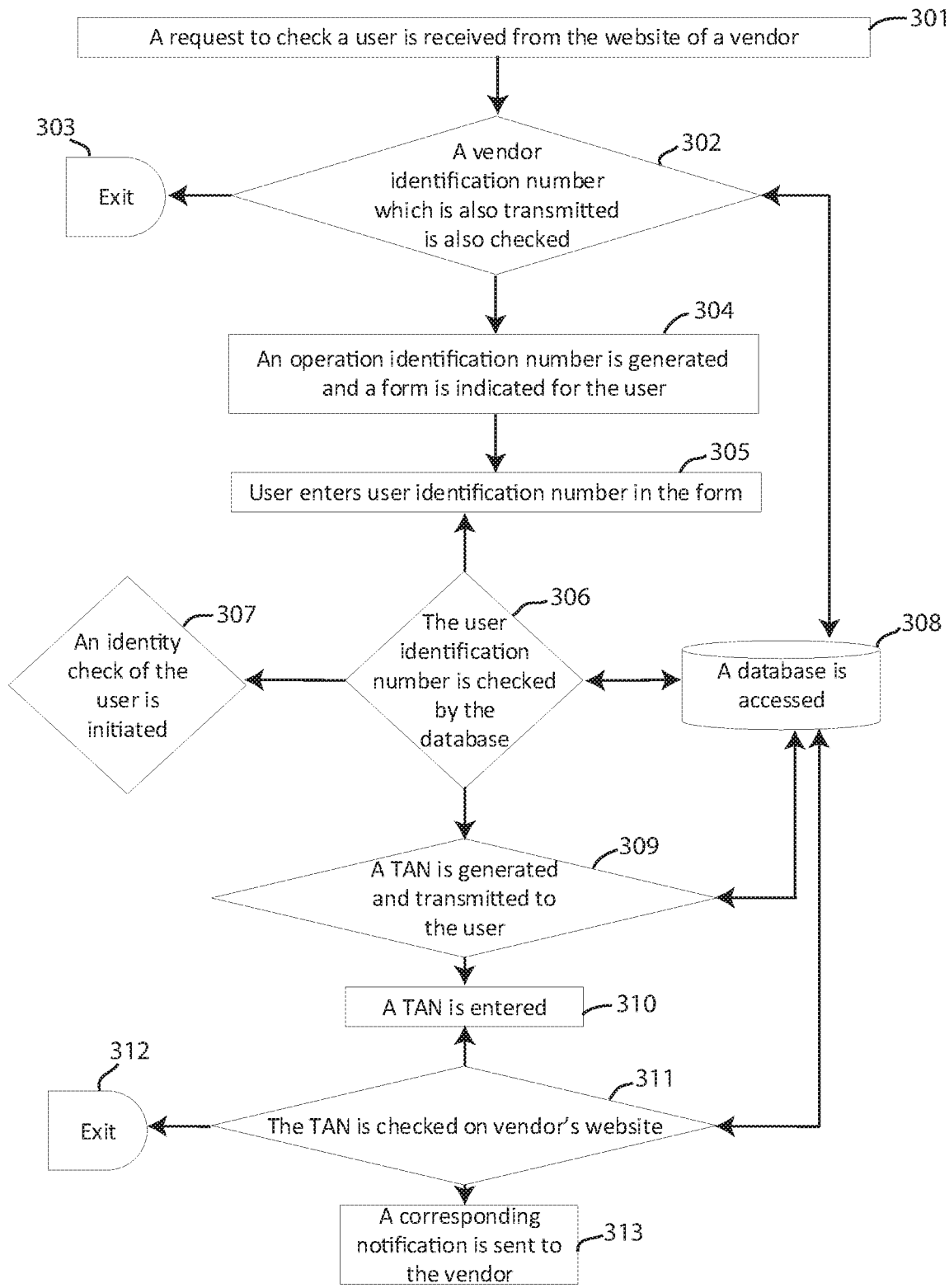
Figure 4:
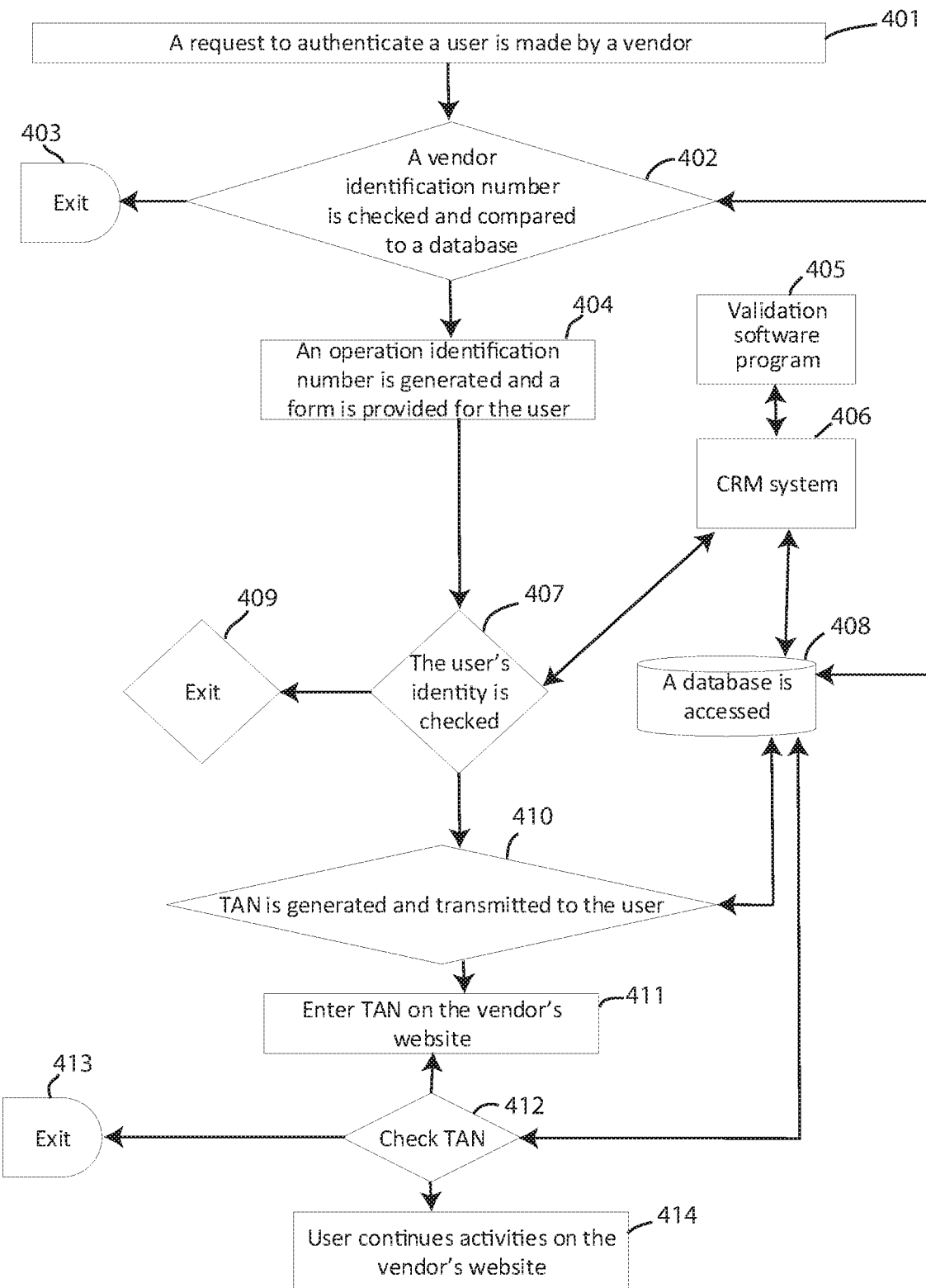
Figure 5:
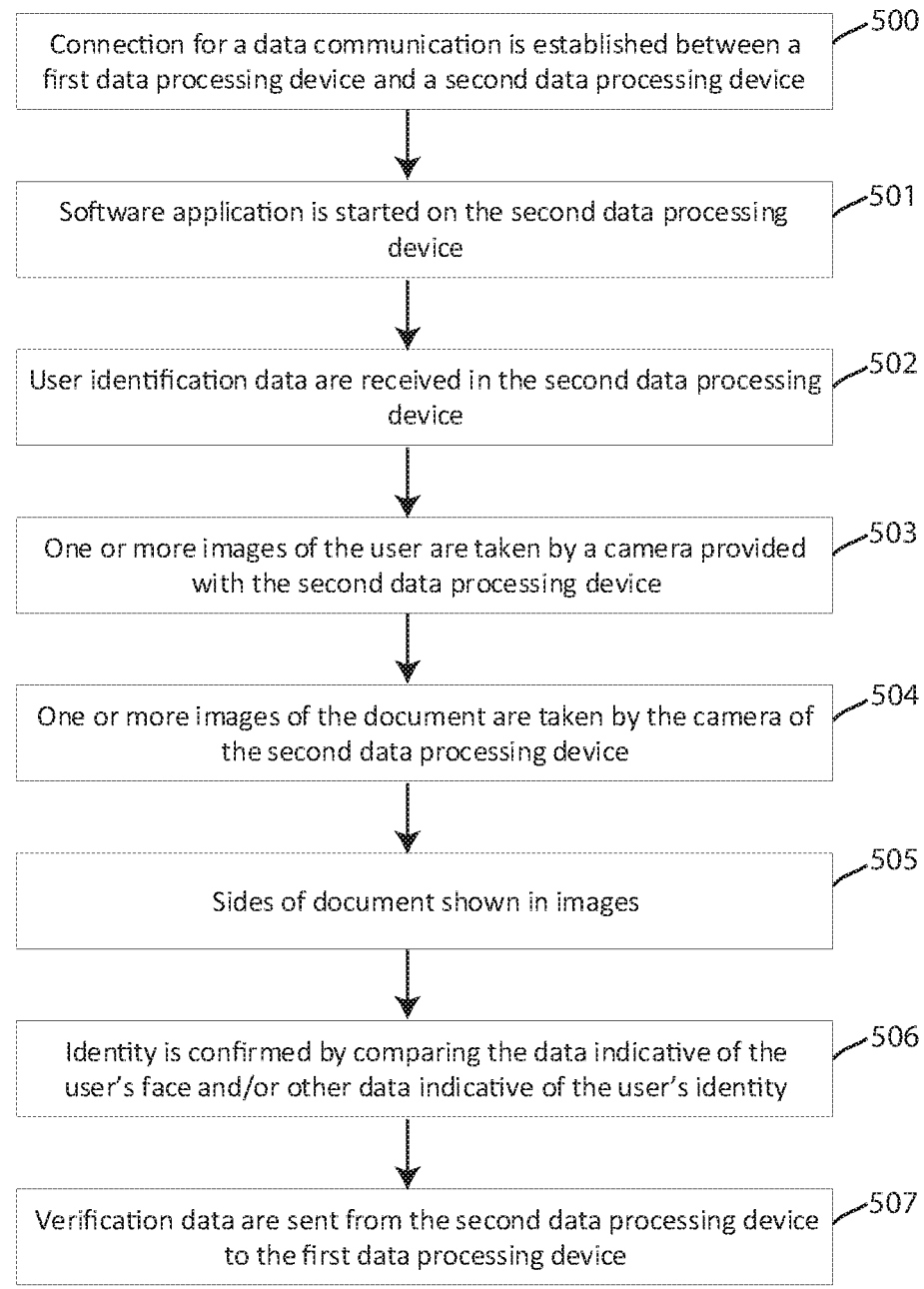

Some of the embodiments will be described in detail, with reference to the following figures, wherein like designations denote like members, wherein:

FIG. 1 is a flowchart of an overview of the method;
FIG. 2 is a flow chart of the detailed sequence of the method:
FIG. 3 is a flowchart for a regular customer:
FIG. 4 is a flowchart for a new customer; and
FIG. 5 is a flowchart of another embodiment of a method for verifying a user's identity.

DETAILED DESCRIPTION

FIG. 1 shows a flowchart that gives an overview of the method. A user wishes to initiate an ordering process 100 in a webshop. Before finalizing the order, the user enters various personal information on the website of the shop, including for example his name, address and date of birth (step 101). Then, in step 102 a check is carried out as to whether an authentication and/or age verification of the user is required. This may be the case for example if there are items in that user's cart that must not be sold to minors.

If authentication and age verification is not required, the order process continues from step 116. The user can then initiate payment process 117 and the order is completed.

If verification of the user's identity is required, there are two possibilities. The user can involve a service provider, which performs the identification (step 103) online. The process can be performed by the user with the aid of the computer (tablet, smartphone) that is used to make the order. In this case, the system first checks whether the user is already a regular customer at the service provider (step 104). For this, the user's personal data, which the user has entered on the shop website is compared with data in the service provider's database. If a match is found, the user is considered to be a regular customer (step 105). Alternatively, the user may enter a user identification number, which is checked. If the user has been identified as a regular customer, a transaction number (TAN) is generated by a server of the service provider and transmitted to the user's computer (e.g., by email) and/or a telephone belonging to the user (e.g., via SMS). The user can enter the TAN on the shop website and thus confirm his identity (step 106). If the entry of the TAN has been successful (step 107), the authentication is considered successful (step 111). The user can complete the order with the payment process 117.

If the user is not recognized as a regular customer in step 104, or if the entry of the TAN in step 107 was not successful, the user is redirected to an identity check 108. A video link is established between the user's computer and a test server, which includes a video and audio transmission system. In this way, the test server can be used to check whether a required video software is installed on the user's computer. Should this not be the case, a link to download a video software program can be provided (step 112). The test server is used to capture an operation identification number which is assigned to the user's personal data (step 109). The operation identification number can be generated on the service provider's server. Subsequently, the operation identification number can be transmitted to the user's computer, and displayed therein in a browser, for example. The user can communicate the operation identification number to the agent operating the test server via a video link, and the agent enters said number in the test server. The operation identification number is transmitted to the service provider's server. In response, the service provider's server transmits the user's personal data that is associated with the operation identification number to the test server. Optionally, the transmitted personal data of the user may be supplemented (step 113).

An identity card of the user is captured and then evaluated via the video link. For the evaluation, a photo of the user is taken (step 110). The evaluation may include a comparison of the user's transmitted personal data with information on the identity card. A check of security features of the identity card may also be carried out. The comparison and/or examination can be performed automatically via the test server (step 114). The agent can intervene if necessary to provide support by giving the user instructions on how to hold his identity card in front of the camera, so that the relevant information can be collected. The result of the evaluation of the identity card is saved in the database along with the operation identification number. If the check is successful (step 111), that is to say the user's identity has been confirmed, a corresponding report is sent to the shop website. The user can then complete the order with the payment process 117. This method enables authentication of the user within a few minutes and requires little effort on the part of the user.

If the user decides not to use the service provider, he still has the option of using the known postal authentication method (step 115). After this procedure is successfully completed, the user can also bring the ordering process to an end with payment process 117. In this case, however, the process will take a minimum of a few days.

FIG. 2 shows a detailed plan of the operations at the service provider. The service provider's server receives a request to check a user from the shop website (step 201). The request is accompanied by a vendor identification number and personal data of the user, which is checked in step 202. Besides this, additional data of the webshop (vendor) may also be checked in step 206. If the result of the check is negative, an exit 204 is executed. If the vendor identification number exists in the database, a check is made to determine whether the user's transmitted personal data corresponds to prescribed data fields (step 203). The guidelines were created in advance by the vendor and stored (step 207). An exit 205 is executed if the requirements are not met. In the case of exits 204 and 205, a new request with revised data can be sent.

If the guidelines are satisfied, a new operation is created in a database (step 208). An operation identification number is generated and transmitted (step 209). A form for authenticating the user is also retrieved. In the form, the user can inform the service provider whether he is already a regular customer or not (step 210).

If it is indicated that the user is a regular customer, a corresponding check is carried out (step 212). As was explained earlier, the personal data of the user and/or a customer identification number may be checked (step 213) for this purpose. If the check is successful, a TAN is generated (step 215) and sent to the user (steps 216, 217). The TAN is stored in a database (step 221). If the result of the check is negative, an exit 214 is executed. Then, an input in the form may be carried out (step 210). The TAN is entered in the form in step 218 and then tested in step 219, for example by the service provider's server. If the check is successful, the information is transmitted to the shop website to the effect that the user has been registered and the identification was successful (step 220).

If the user is not a regular customer, the identity verification described above is performed (step 211). Upon successful completion, the TAN is generated and transmitted (steps 215, 216 and 217). After entry and a positive check of the TAN, again, the vendor is informed (steps 218, 219 and 220).

If the result of the TAN check is not positive, an exit 222 is effected. The number of entry attempts can be counted when the TAN is checked. If the number of entry attempts is less than or equal to three (step 223), the process returns to step 210. If the number of unsuccessful attempts to enter is greater than three, an exit 225 is effected. The vendor is notified of the failure of the authentication of the user (step 220).

FIG. 3 shows the sequence for a regular customer. A request to check a user is received from the website of a vendor (step 301). A vendor identification number which is also transmitted is also checked (step 302). For this a database is accessed (step 308). If the result is negative, an exit 303 is executed. If the check is positive, an operation identification number is generated and a form is indicated for the user (step 304). The user can enter his user identification number in the form (step 305). The user identification number is checked by the database (step 306). If the check fails, an exit is executed. Alternatively, the e-mail address of the user can be checked to determine if he is a regular customer. An identity check of the user can then be initiated (step 307). If the result is positive, a TAN is generated and transmitted to the user (step 309). The TAN is assigned to the operation identification number. The TAN is entered (step 310) and checked (step 311) on the vendor's website. If the check is unsuccessful, exit 312 is executed. If the result of the check is positive, a corresponding notification is sent to the vendor (step 313). The user can continue his activities, for example, to complete an order process.

FIG. 4 shows a flowchart for a new customer. In a first step, again a request to authenticate a user is made by a vendor (e.g., webshop operator) in step 401. A vendor identification number is checked and compared to a database (step 402). If the result is negative, an exit 403 is executed. If the check is successful, an operation identification number is generated and a form is provided for the user (step 404). Then the user's identity is checked (step 407). The details of the identity verification have been explained previously. In this case, the database can be accessed 408, optionally using a CRM system 406 and/or a validation software program 405. If the user's identity cannot be established, an exit 409 is executed. If authentication is successful, a TAN is generated and transmitted to the user (Step 410). After entering the TAN on the vendor's website (step 411) this is checked (step 412). In this case, the database 408 in which the TAN is stored together with the associated operation identification number can be accessed. If the result is negative, again an exit 413 is executed. If the result of the check is positive, the user may continue his activities on the vendor's web site (step 414).

FIG. 5 shows a float chart for an alternative method for verifying a user's identity comprising evaluating a document assigned to the user.

The identity of a person who is the owner of the document (identity document, e.g. identity card) may be verified by the method for verification of the user's identity. A connection for a data communication is established between a first data processing device and a second data processing device in (step 500). The second data processing device is used by a user and may be provided, for example, in a mobile phone, a desktop computer or a laptop computer. The connection for data communication allows for at least one of wireless and non-wireless data communication.

For verification of the user's identity a software application is started on the second data processing device (step 501). The start of the software application may be in response to a user input received in the second data processing device. Alternatively, the software application may be started in response to an input received in the first data processing device followed by transmitting data signals (from the first data processing device) for starting the software application to run on the second data processing device. For example, a user input by an agent may be received in the first data processing device.

In the course of running the software application for user verification in the second data processing device, user identification data are received in the second data processing device (step 502). Such user identification data provide for reference data. For example, one or more images of the user may be taken by a camera provided with the second data processing device, e.g. an image of the face of the user may be received in the second data processing device (step 503).

The image may be taken by the camera in response to receiving a user input in the second data processing device. The images may be received, in addition or alternatively, as a video. A live video may be recorded. Alternatively or in addition, data indicative of the user's birthday and/or an identification number provided on the document may be received in the second data processing device, for example, by a user input.

Referring to step 504, one or more images of the document are taken by the camera of the second data processing device. At least one of the front and the back side of the document may be shown in the images received in the second data processing device (step 505).

In step 506 the reference data are compared to measurement data determined from a digital representation of the images. For example, data indicative of the user's face, such data determined from processing the image data and/or the video, may be compared to the reference data indicative of a photo of the user's face provided on the document which, for example, may be an identification document (e.g. ID card). Alternatively or in addition, other data taken from the images of the document may be compared to reference data, for example, data indicative of the user's birthday and/or of data indicative of a document number provided on the document.

The reference data is received in the second data processing device, for example, by user input.

The user's identity is verified by the software application running in the second data processing device if, for example, identity is confirmed by comparing the data indicative of the user's face and/or other data indicative of the user's identity (step 506). If the reference data which may be received from a database and the measurement data match, user's identity may be verified. In addition or alternatively, reference data and identity or measurement data received in the second data processing device may be compared automatically by another software application running on at least one of the first and the second data processing device.

If the user's identity has been verified, verification data are sent from the second data processing device to the first data processing device (step 507), the verification data indicative of the successful verification of the user's identity.

In addition, one or more of the images (image data) taken by the camera may be transmitted from the second data processing device to the first data processing device and stored in a storage device assigned to the first data processing device. For example, the images of the document and an image showing at least the user's face may be transmitted from the second data processing device to the first data processing device.

The method for verification of the user's identity may comprise steps of generating, by a processor, an operation or case identification number assigned to user data, for example, the images transmitted from the second data processing device to the first data processing device. Such images may be stored together with the operation identification number in the storage device assigned to the first data processing device. The operating identification number may be temper-proof.

Alternatively or in addition, other data than the image data may be transmitted from the second data processing device to the first data processing device after successfully verifying the user's identity, for example the document number of the user's document.

In the alternative embodiment described above, a video data link for transmitting video signals between the second data processing device and the first data processing device may be omitted. Verification of the user's identity can be conducted by data processing in the first data processing device by the software application and/or another software application.

The images taken by the camera of the second data processing device (user device) may be received as a stream of video data in the second data processing device, such stream providing one or more images and/or a video. Therefore, such images may be transmitted to the first data processing device by transmitting the stream of video data.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for verifying a user's identity, comprising:
   connecting a first and a second data processing device for data communication;
   running a software application in the second data processing device;
   for user verification, receiving user identification data in the second data processing device, the user identification data comprising reference data;
   receiving one or more images of a document assigned to the user in the second data processing device;
   determining measurement data from image data providing a digital representation of the one or more images;
   comparing the reference data to the measurement data determined from the digital representation of the one or more images;
   providing verification data in the second data processing device, the verification data indicative of the user's identity being verified in the step of comparing the reference data to the measurement data;
   transmitting the image data from the second data processing device to the first data processing device;
   generating, by a processor, an operation identification number assigned to the image data transmitted from the second data processing device to the first data processing device, wherein the operation identification number is transmitted from the processor to the second data processing device and the operation identification number is transmitted from the second data processing device to the first data processing device, the operation identification number being a unique identifier of an identification operation for the user, and including a randomly generated: number, characters, or a sequence of numbers and/or characters.

2. The method of claim 1, further comprising transmitting the verification data from the second data processing device to the first data processing device.

3. The method of claim 1, further comprising generating a tamper-proofed operation identification number.

4. The method of claim 1, further comprising storing the image data together with the operation identification number in a storage device assigned to the first data processing device.

5. The method of claim 1, further comprising capturing the one or more images by a camera of the second data processing device.

6. The method of claim 1, further comprising providing both the user identification data and the one or more images showing a user's face in the second data processing device.

7. The method of claim 1, further comprising: storing the image data in a storage device assigned to the first data processing device.

\* \* \* \* \*